(No Model.) 2 Sheets—Sheet 1.

W. V. LOCKWOOD.
DEVICE FOR RETURNING SIGNALS IN DISTRICT TELEGRAPH SYSTEMS.

No. 379,404. Patented Mar. 13, 1888.

Witnesses.
J. H. Shumway.
Fred C. Earle.

Wm. V. Lockwood
Inventor
By Atty.
John C. Earle.

(No Model.) 2 Sheets—Sheet 2.
W. V. LOCKWOOD.
DEVICE FOR RETURNING SIGNALS IN DISTRICT TELEGRAPH SYSTEMS.
No. 379,404. Patented Mar. 13, 1888.
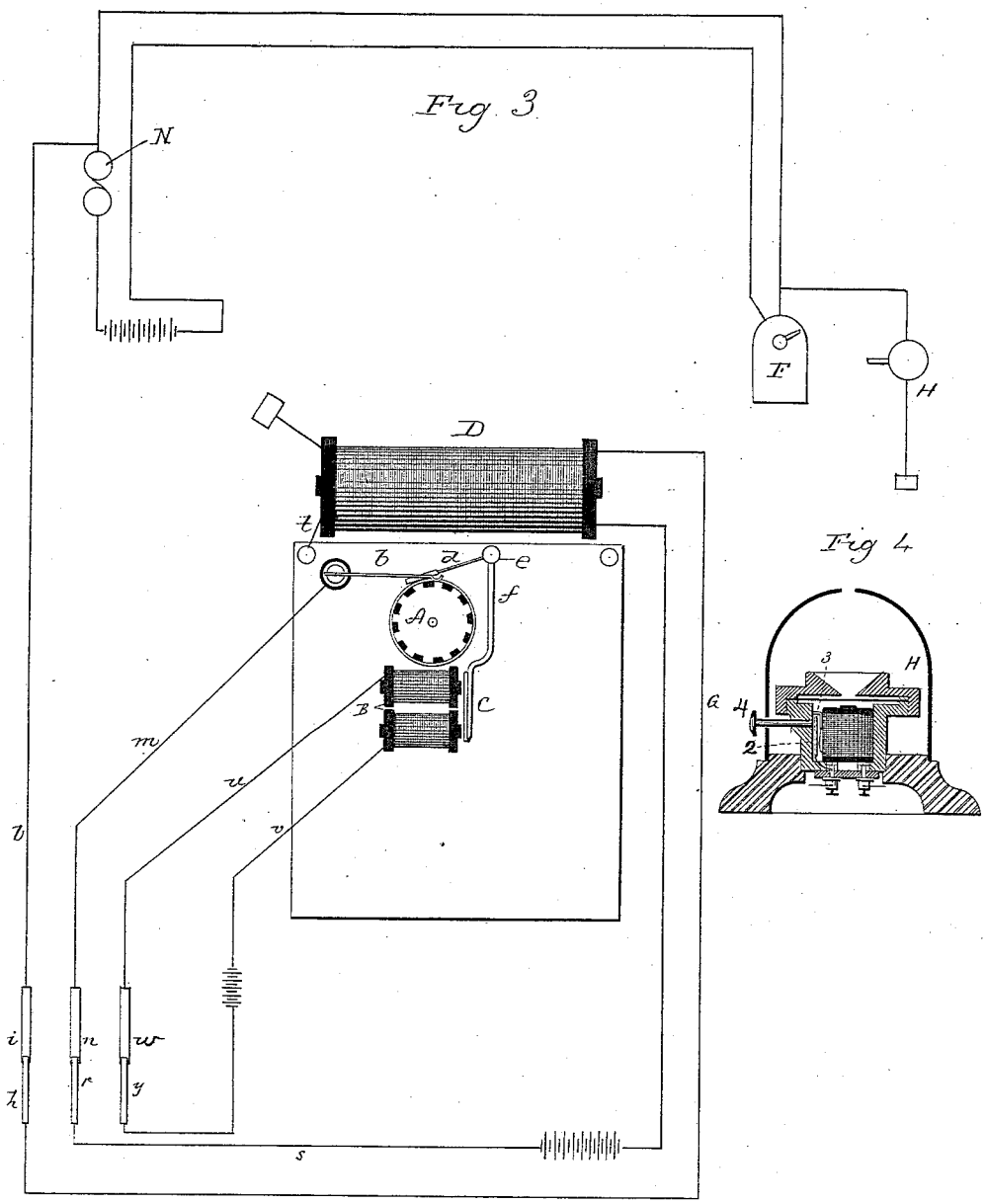
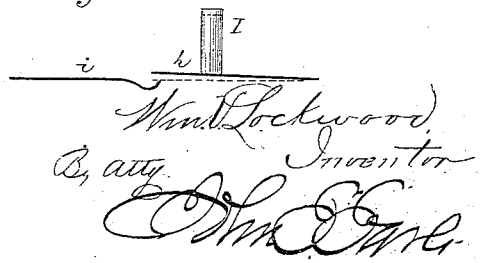

UNITED STATES PATENT OFFICE.

WILLIAM V. LOCKWOOD, OF WATERBURY, CONNECTICUT, ASSIGNOR OF ONE-HALF TO G. S. PARSONS, OF SAME PLACE.

DEVICE FOR RETURNING SIGNALS IN DISTRICT-TELEGRAPH SYSTEMS.

SPECIFICATION forming part of Letters Patent No. 379,404, dated March 13, 1888.

Application filed July 18, 1887. Serial No. 244,663. (No model.)

*To all whom it may concern:*

Be it known that I, WILLIAM V. LOCKWOOD, of Waterbury, in the county of New Haven and State of Connecticut, have invented a new Improvement in Devices for Returning Signals in District-Telegraph Systems; and I do hereby declare the following, when taken in connection with accompanying drawings and the letters of reference marked thereon, to be a full, clear, and exact description of the same, and which said drawings constitute part of this specification, and represent, in—

Figure 1:
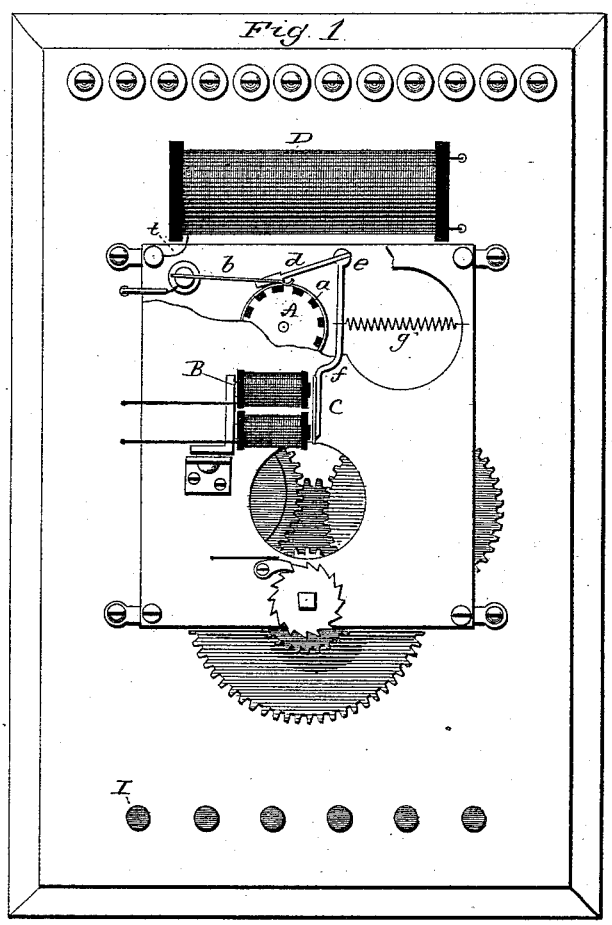
Figure 2:
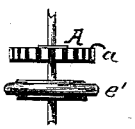

Figure 1, a top or plan view of an instrument for making return-signals from the central office; Fig. 2, a detached view of the circuit-breaker. Fig. 3 represents, in diagram, the instruments at the central office and one station; Fig. 4, the repeater by which the return-signal is communicated at the subscriber's station; Fig. 5, a detached view illustrating the opening and closing of the contacts.

This invention relates to an improvement in district-telegraph systems.

The object of my invention is a simple device by which a return or answer to the call may be made, that the person calling may be informed that the call has been duly received.

In Fig. 1 I illustrate the instrument by means of which the return signal is given. It consists of a suitable clock-work adapted to impart rotation to a circuit-breaker, A. It is unnecessary to describe the clock-work by which the rotation is imparted, as this is too well known to require particular description. The wheel A is of metal, and has in its periphery a series of recesses or spaces filled with non-conducting material, $a$, thus presenting alternate metallic and non-metallic surfaces. Upon the periphery of this wheel a metal finger, $b$, bears, so that as the wheel revolves the metallic and non-metallic surfaces of the wheel come alternately in contact with the finger $b$, so that the frame or wheel A and the finger $b$ being in circuit the revolution of the wheel A will, through its metallic and non-metallic surfaces, produce a succession of breaks in the circuit.

A stop is arranged to arrest the revolution of the wheel A, or the work of the movement, so that at the will of the operator the circuit-breaker may be set in motion or its motion arrested. As represented, this stop device consists of a lever, $d$, adapted to bear upon the periphery of a wheel, $e'$, on the shaft of the circuit-breaker A. (Seen in Fig. 2.) The lever $d$ extends from a vertical shaft, $e$, in the frame of the clock-work. On the frame of the clock-work, or at some convenient point, a common magnet, B, is applied, having an armature, C, attached to an arm, $f$, extending from the shaft $e$, so that when the circuit through the magnet B is open and the armature free the lever $d$ will bear frictionally upon the wheel $e'$, under the action of a suitable spring, $g$, so as to arrest the rotation of the circuit-breaker A; but when the circuit through the magnet B is closed then the circuit-breaker is relieved from the action of the lever $d$ and is free to revolve.

D represents an induction-coil.

In Fig. 3 I represent this apparatus as applied in a working-circuit. F represents the call-box of a station. N represents a common district-telegraph relay, which it is unnecessary to particularly describe, it being understood that the instrument which I have described is arranged at the central office. From the induction-coil one wire, G, leads to a contact, $h$, which is adjacent to a corresponding contact, $i$, on the station-line $l$, and so that the two contacts $h$ $i$ brought together close the circuit to the station through the induction-coil to ground. From the finger $b$, which, it should be stated, is insulated from the frame of the clock-work, a line, $m$, leads to a contact, $n$, and to a corresponding contact, $r$, a line, $s$, leads from the induction-coil. This line $s$ is connected through the induction-coil with the frame of the clock-work or circuit-breaker wheel A, as at $t$, so that when the two contacts $n$ $r$ are brought together the circuit is closed through the circuit-breaker, the induction-coil, and frame. From the magnet B one wire, $u$, leads to one contact, $w$, and the other wire, $v$, leads to a corresponding contact, $y$, so that bringing the contacts $w$ $y$ together closes the circuit through the magnet B, which will cause the armature to close and correspondingly turn the lever $d$ and leave the circuit-breaker wheel A free to run. At the subscriber's station an instrument, H, is arranged, consisting of an electro-magnet and vibrating armature, as seen in Fig. 4, (not necessary to be particularly described,) but is provided with contacts 2 and 3 with the respective lines, one of which runs to ground, and the other is in connection with the main line, as shown. A suitable device—say a button, 4—is provided, by which the contacts 2 and 3 may be brought together to close the circuit through the instrument H, which I call a "receiver." Normally the circuit through the receiver stands closed.

The operation of the apparatus is as follows: When a call is made at one station, the signal is communicated to the central office in the usual manner. The person at the station after having made the call closes the circuit through the receiver. At the central office, when the call is received, the operator closes the circuit through the contacts $h\,i$; also through the contacts $n\,r$, and also through the contacts $w\,y$. The latter releases the clock-work, so that the circuit-breaker is at once set in rapid revolution, and produces a rapid make and break of the circuit through the induction-coil, and thence through the main line to the station, which make and break is audibly reproduced in the receiver, so that the person at that station will thereby be informed that the call has been received.

The devices for bringing the several contacts together may be in the form of keys, as seen in Fig. 1. I representing the key which is adapted to bring the several contacts together by a single pressure. This may be done, as seen in Fig. 5, which represents the contacts $h\,i$, the contact $h$ being in the form of a spring, so that a pressure upon the key I will force the contact $h$ downward into engagement with the contact $i$, as seen in broken lines, Fig. 5; but any of the many known devices for thus opening and closing circuits may be employed. In Fig. 2 several such keys are represented, the apparatus being adapted to several independent circuits.

Instead of the peculiar circuit-breaker which I have illustrated to produce the return-signal, any of the known circuit-breakers adapted for the purpose may be employed.

The repeater may be inclosed in a case, as indicated in Fig. 4, with an aperture through it for convenience of receiving the signal.

What I claim is—

In a district-telegraph system, the combination of a clock-work at the central station, the rotating circuit-breaker A, having in its periphery alternate series of metallic and non-conducting spaces, magnet B, armature C, stop in connection with said armature C, adapted to engage and disengage said clock-work to stop and start the same, finger $b$, bearing upon said periphery of said circuit-breaker, a receiver at the subscriber's station, three contacts at the central station, to wit, $n\,r$, in connection with the primary coil and finger, $b\,w\,y$, in connection with the battery and magnet B, and $i\,h$, in the main line, with secondary circuit and receiver both to ground, with contact 2 3 in the receiver, all substantially as described.

WM. V. LOCKWOOD.

Witnesses:
JOHN E. EARLE,
FRED C. EARLE.